US006548452B1

(12) United States Patent
Nattier et al.

(10) Patent No.: US 6,548,452 B1
(45) Date of Patent: *Apr. 15, 2003

(54) WEIGHT MATERIAL FOR DRILLING FLUIDS AND METHOD OF CREATING AND MAINTAINING THE DESIRED WEIGHT

(75) Inventors: James A. Nattier, Houston, TX (US); Thomas G. Shumate, Spring, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

This patent is subject to a terminal disclaimer.

(21) Appl. No.: 09/612,613

(22) Filed: Jul. 9, 2000

Related U.S. Application Data

(62) Division of application No. 09/192,120, filed on Nov. 13, 1998, now Pat. No. 6,180,573.
(60) Provisional application No. 60/066,255, filed on Nov. 20, 1997.

(51) Int. Cl.$^7$ ................................................ C09K 7/00
(52) U.S. Cl. ........................................ 507/140; 507/906
(58) Field of Search ................................ 507/140, 269, 507/906

(56) References Cited

U.S. PATENT DOCUMENTS

| 1,991,637 A | 2/1935 | Harth | 255/1 |
|---|---|---|---|
| 2,257,114 A | 9/1941 | Harth | 255/1 |
| 2,283,564 A | 5/1942 | Means | 252/8.5 |
| 2,298,984 A | 10/1942 | Stinson | 252/8.5 |
| 2,365,383 A | 12/1944 | Bond | 252/8.5 |
| 2,393,166 A | 1/1946 | Hoeppel | 252/8.5 |
| 2,442,120 A * | 5/1948 | Duke | 507/140 |
| 2,551,874 A | 5/1951 | Cerf | 252/8.5 |
| 3,490,535 A | 1/1970 | Messenger | 166/292 |
| 3,737,037 A | 6/1973 | Bone, III | 210/73 |
| 3,766,997 A | 10/1973 | Heilhecker et al. | 175/66 |
| 3,867,128 A * | 2/1975 | Hancock, Jr. | 507/140 |
| 3,887,474 A | 6/1975 | Senfe et al. | 252/8.5 |
| 4,092,407 A | 5/1978 | Rohrborn et al. | 423/633 |
| 4,141,843 A | 2/1979 | Watson | 252/8.55 R |
| 4,217,229 A | 8/1980 | Watson | 252/8.55 R |
| 4,436,681 A | 3/1984 | Barczak et al. | 264/8.5 B |
| 4,519,922 A | 5/1985 | Sutton et al. | 252/8.5 B |
| 4,584,327 A | 4/1986 | Sutton | 523/285 |
| 5,084,353 A | 1/1992 | Cobbledick et al. | 428/413 |
| 5,366,095 A | 11/1994 | Martin | 209/139.2 |
| 5,431,484 A | 7/1995 | Zaiger | 299/9 |
| 5,618,860 A | 4/1997 | Mowrer et al. | 523/421 |
| 6,180,573 B1 * | 1/2001 | Nattier et al. | 507/269 |

OTHER PUBLICATIONS

Gray Et Al., Compositions and Properties of Oil Well Drilling Fluids, Fourth Edition, pp. 532–533, (1980).*

* cited by examiner

Primary Examiner—Philip Tucker
(74) Attorney, Agent, or Firm—Craig W. Roddy; Karen B. Tripp

(57) ABSTRACT

Drilling fluid additives are designed to increase the density of drilling fluids while minimizing the increase in the resistance to flow of the drilling fluid. In particular, barite particles are added to the drilling fluid as a weight material where the barite particles include at least 85% by weight particles less than 75 microns and greater than 6 microns in equivalent spherical diameter.

6 Claims, No Drawings

WEIGHT MATERIAL FOR DRILLING FLUIDS AND METHOD OF CREATING AND MAINTAINING THE DESIRED WEIGHT

RELATED APPLICATION

This application claims priority to U.S. Provisional Patent Application Ser. No. 60/066,255 entitled "Improved Weight Drilling Material for Drilling Fluids and Method of Creating and Maintaining the Desired Weight" filed Nov. 20, 1997 by James A. Nattier and Thomas G. Shumate. New matter has been added to this application for which priority is not claimed.

This application is a division of U.S. patent application Ser. No. 09/192,120, filed Nov. 13, 1998 now U.S. Pat. No. 6,180,573 B1.

FIELD OF THE INVENTION

The present invention relates to a composition of matter and a method of using such composition in drilling operations and more particularly relates to weighted drilling fluids and a method of forming and maintaining such fluids to aid in drilling operations in subterranean formations.

DESCRIPTION OF THE PRIOR ART

A variety of compositions used to aid in the production and removal of cuttings (particles released during drilling) from a borehole in the earth are commonly referred to as drilling fluids or drilling muds. For example, in the drilling of an oil well, a drilling fluid is typically circulated down the borehole and back to the surface in a continuous loop. The primary functions of the fluid are to cool and lubricate the drill bit, stabilize uncased sections of the borehole, transport cuttings back to the surface and prevent the inflow of pressurized fluids like gas, oil or water from penetrated formations.

One physical property of a drilling fluid critical to carrying out many of these functions is its density. The density and depth a column of drilling fluid determine the pressure exerted by the drilling fluid on the surrounding formation. In practice, the density of a drilling fluid is usually carefully controlled to exert sufficient downhole pressure to stabilize the walls of the borehole and prevent the inflow of oil or gas from formations that are pierced. In the extreme case, failure to maintain adequate fluid density can lead to a catastrophic, uncontrolled inflow of gas or oil known as a "blow-out".

In many drilling situations, it is necessary to increase the density of the fluid by adding so-called "weight materials". Weight materials are various inert, high-density particulate solid materials with a normal particle size smaller than 75 microns and preferably smaller than 50 microns. Finely ground barite, hematite and ilmenite are some example of known weight materials.

Because large quantities of weight materials are often added to drilling fluids, the impact of a weight material on the flow properties (such as viscosity) of a drilling fluid is of major importance. It is necessary that the required amount of weight material can be added with a minimum adverse increase in the resistance to flow of the fluid. There is also an upper limit to the amount of weight material that can be added to a drilling fluid before it becomes too thick to be of any practical use.

Various approaches have been devised to provide the desired density with a minimum thickening of the drilling fluid. One obvious approach has been to utilize weight materials of increasingly higher specific gravity to lower the quantity of weight material needed to achieve a given drilling fluid density. Another method is disclosed in U.S. Pat. No. 5,007,480 for using a manganomanganic oxide ($Mn_3O_4$) particulate material having a particle size of at least 98% below 10 microns in combination with conventional weight materials such as barite to obtain a drilling mud with a higher density than what is possible using barite alone. Another common approach is to add chemical dispersants to thin the drilling fluid.

It is desired to find an improved weight material and a method of providing such weight material that minimizes the adverse impact on flow properties that increasing additions of weight materials may have on a drilling fluid and increases the maximum density achievable before the fluid becomes too thick.

SUMMARY OF THE INVENTION

It is, therefore, the object of the present invention to provide an improved weight material, that shows good property characteristics in drilling fluids, by removing by classification some or all of the finest particles from a finely ground barite and then monitoring and maintaining the selected size by adding coarser material as the particle size degrades during use.

DESCRIPTION OF THE PREFERRED EMBODIMENT

As a drilling operation in subterranean formation progresses, a drilling fluid is pumped into the borehole such that is circulates around the drill bit thus cooling the drill bit. The drilling fluid then carries the cuttings from the drilling operation back up through the borehole to the surface where the cuttings are removed from the drilling fluid so that the drilling fluid can be recirculated into the borehole. Additives are added to the drilling fluid for various reasons such as to provide a weight factor to provide a drilling fluid of a desired density to exert sufficient downhole pressure to stabilize the walls of the borehole and prevent the inflow of oil, gas and other materials from surrounding formations.

In the present invention, a material such as barite is finely ground (using conventional grinding methods) to a particle size ("the selected size") typical of weight materials presently in commerce and usually meeting the specifications for barite used as a drilling fluid material established by the American Petroleum Institute (API) in API Specification 13A, Section 2. The barite is subsequently classified to remove some or all of the finest particles to improve its performance in drilling fluid.

In the preferred embodiment of the invention, the classified barite contains about 0–5% by weight of particles larger than about 75 microns and about 0–10% by weight of particles less than about 6 microns as determined using American Petroleum Institute test methods. It is worthy of note that, depending on the size and quantity of fine particles removed, the classified barite may no longer meet the API specifications.

The classification can be accomplished by any of several known methods for separating particulate materials into separate coarse and fine fractions. One example of a suitable classification system is taught in U.S. Pat. No. 5,366,095 where a rotating turbine is used to impart centrifugal force on particles that are suspended in an air stream. Larger particles are thrown radially away from the airflow and are captured by the device while smaller particles of insufficient mass to be rejected by the centrifugal force remain entrained in the airstream and are separately recovered. Adjustment of the airflow and speed of rotation of the turbine allows for efficient separations at a desired particle size.

The classified barite material is then added to the drilling fluid to obtain the desired density. During the circulation of the drilling fluids containing the selected-size barite particles, the particles may degrade into a smaller size. Therefore, to maintain the selected size of barite present in the drilling fluid, a coarser grind of barite material can be periodically added to the drilling fluid.

The present invention is further described by the following examples.

EXAMPLE 1

Certain physical properties of two barites, A and B, are compared in TABLE I below. The physical properties were determined using the test procedures outlined in the American Petroleum Institute's "specification for Drilling-Fluid Materials" number 13A, Section 2.

TABLE I

| PROPERTY | API SPECIFICATION | BARITE A | BARITE B |
| --- | --- | --- | --- |
| Density, g/cm$^3$ | 4.20 minimum | 4.24 | 4.37 |
| Water Soluble Alkaline Earth Metals as Calcium, mg/kg | 250 maximum | 61 | 20 |
| Residue greater than 75 micrometers, weight percent | 3.0 maximum | 2.2 | 3.2 |
| Particles less than 6 micrometers in equivalent spherical diameter weight percent | 30 maximum | 23.2 | 7.6 |

EXAMPLE 2

Barite A is the American Petroleum Institute's Calibration Barite commonly used for test procedure calibration and laboratory testing of drilling fluids. It meets all API specifications and is typical of barite used as a weight material. Barite B was prepared using the methods of the present invention to lower the percentage of particles less than 6 microns to 7.6% by weight.

Two drilling fluids of equal density, A and B, were then prepared using Barites A and B respectively and tested for certain rheological properties. The drilling fluids were prepared and tested according to the procedures outlined by the American Petroleum Institute in API RP131 "Standard Procedures for Laboratory Testing Drilling Fluids". The results for the rheological properties of the drilling fluids at 150 degrees Fahrenheit are shown in TABLE II.

TABLE II

| PROPERTY | FLUID A | FLUID B |
| --- | --- | --- |
| Plastic Viscosity, cP | 34 | 40 |
| Yield Point, lb/100 ft$^2$ | 0 | 0 |
| Shear Strength, lb/100 ft$^2$ | 522 | 265 |

It is evident from TABLE II that Fluid B, prepared with the classified barite of the present invention, exhibits a markedly lower shear strength than Fluid A, prepared with a conventional barite. Fluid B, therefore, will have a much lower resistance to flow following static aging than Fluid A.

EXAMPLE 3

Contaminants typical of those commonly incorporated into a drilling fluid during the drilling process in the form of powered shale were then added to Fluid A and Fluid B and the rheological properties of the contaminated fluid were determined. TABLE III illustrates the rheological properties of the fluids contaminated with powdered shale.

TABLE III

| PROPERTY | FLUID A | FLUID B |
| --- | --- | --- |
| Plastic Viscosity, cP | 35 | 43 |
| Yield Point, lb/100 ft$^2$ | 5 | 1 |
| Shear Strength, lb/100 ft$^2$ | 871 | 566 |

EXAMPLE 4

Contaminants typical of those commonly incorporated into a drilling fluid during the drilling process in the form of a brine solution were then added to Fluid A and Fluid B and the rheological properties of the contaminated fluid were determined. TABLE IV illustrates the rheological properties of the fluids contaminated with a brine solution.

TABLE IV

| PROPERTY | FLUID A | FLUID B |
| --- | --- | --- |
| Plastic Viscosity, cP | 46 | 42 |
| Yield Point, lb/100 ft$^2$ | 23 | 1 |
| Shear Strength, lb/100 ft$^2$ | 1168 | 627 |

As TABLE III and TABLE IV illustrate, Fluid B prepared with the classified barite of the present invention continued to exhibit acceptable shear strengths following contamination, while the shear strength of Fluid A Rose to levels rendering the fluid impractical to use.

The foregoing description of the invention is intended to be a description of a preferred embodiment. Various changes in the details of the described composition and method can be made without departing from the intended scope of this invention.

We claim:

1. A drilling fluid comprising a weight material for increasing the density of said drilling fluid where said weight material is finely ground and the smallest particle of said weight material have been removed such that the weight material comprises about 0 to about 10% by weight particles less than about 6 microns in equivalent spherical diameter and about 0 to about 5% by weight particles larger than about 75 microns in equivalent spherical diameter, wherein after use in drilling, said drilling fluid has added thereto, for further use in drilling, additional coarser weight material such that the weight material overall comprises about 0 to about 5% by weight particles larger than about 75 microns in equivalent spherical diameter and about 1 to about 10% by weight particles less than about 6 microns in equivalent spherical diameter.

2. The drilling fluid of claim 1 wherein said weight material is comprised of barite.

3. The drilling fluid of claim 1 wherein said weight material consists essentially of particles in the range of about 6 microns to about 75 microns before circulation of the fluid in a subterranean formation in association with drilling of said formation.

4. A method for preparing and maintaining a drilling fluid comprising:

providing a drilling fluid;

adding a classified weight material to said fluid to increase the density of said drilling fluid to a desired density, wherein said weight material is classified by eliminating or removing particles larger than about 75 microns and less than about 6 microns such that said fluid contains 0–5% by weight particles larger than about 75 microns and 0–10% by weight particles less than about 6 microns;

monitoring the size of said particles of said weight material when said fluid is used in drilling; and adding for further use in drilling, coarser weight material to the drilling fluid to maintain the overall particle size of the weight material in said fluid at about 0 to about 5% by weight particles larger than about 75 microns in equivalent spherical diameter and about 0 to about 10% by weight particles less than about 6 microns in equivalent spherical diameter.

5. The method of claim 4 wherein said initial weight material is comprised of barite.

6. The method of claim 4 wherein said additional weight material is comprised of barite.

* * * * *